(12) United States Patent
Deng et al.

(10) Patent No.: US 11,764,677 B2
(45) Date of Patent: Sep. 19, 2023

(54) CONTROL CIRCUIT, SWITCHING CONVERTER AND INTEGRATED CIRCUIT

(71) Applicant: Silergy Semiconductor Technology (Hangzhou) LTD, Hangzhou (CN)

(72) Inventors: Jian Deng, Hangzhou (CN); Jin Jin, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 163 days.

(21) Appl. No.: 17/500,054

(22) Filed: Oct. 13, 2021

(65) Prior Publication Data

US 2022/0131462 A1 Apr. 28, 2022

(30) Foreign Application Priority Data

Oct. 27, 2020 (CN) .......................... 202011166875.0

(51) Int. Cl.
*H02M 3/158* (2006.01)
*H02M 1/08* (2006.01)

(52) U.S. Cl.
CPC ........... *H02M 3/158* (2013.01); *H02M 1/083* (2013.01)

(58) Field of Classification Search
CPC .... H02M 3/158; H02M 1/083; H02M 1/0054; H02M 3/156
See application file for complete search history.

(56) References Cited

U.S. PATENT DOCUMENTS

| 6,005,780 A | 12/1999 | Hua |
| 6,580,258 B2 | 6/2003 | Wilcox et al. |
| 8,193,797 B2 | 6/2012 | Zhang et al. |
| 8,917,068 B2 | 12/2014 | Chen et al. |
| 9,325,254 B2 | 4/2016 | Deng et al. |
| 9,331,588 B2 | 5/2016 | Chen |
| 9,488,680 B2 | 11/2016 | Xu |
| 2012/0169313 A1 | 7/2012 | Lee |
| 2014/0078789 A1 | 3/2014 | Li et al. |
| 2014/0239934 A1 | 8/2014 | Zhang |
| 2014/0292290 A1* | 10/2014 | Deng ...................... H02M 1/08 323/235 |
| 2015/0160270 A1 | 6/2015 | Shi et al. |
| 2015/0280578 A1 | 10/2015 | Huang et al. |
| 2015/0365084 A1 | 12/2015 | Hirler et al. |
| 2018/0019677 A1* | 1/2018 | Chung .................. H03J 1/0091 |
| 2021/0091678 A1 | 3/2021 | Wang |

FOREIGN PATENT DOCUMENTS

| CN | 102231605 A | 11/2011 |
| CN | 103280965 A | 9/2013 |
| CN | 106130378 A | 11/2016 |
| CN | 107968569 A | 4/2018 |

* cited by examiner

*Primary Examiner* — Adolf D Berhane
*Assistant Examiner* — Afework S Demisse

(57) ABSTRACT

A control circuit for a switching converter having a main power switch, the control circuit including: a voltage generation circuit configured to be connected with a common connection terminal of the main power switch and an inductor to receive a drain-source voltage of the main power switch, and to generate a first voltage according to the drain-source voltage; a valley detection circuit configured to generate a valley detection signal according to the first voltage when the drain-source voltage resonates to a valley; and where the control circuit is configured to turn on the main power switch according to the valley detection signal.

20 Claims, 5 Drawing Sheets

US 11,764,677 B2

CONTROL CIRCUIT, SWITCHING CONVERTER AND INTEGRATED CIRCUIT

RELATED APPLICATIONS

This application claims the benefit of Chinese Patent Application No. 202011166875.0, filed on Oct. 27, 2020, which is incorporated herein by reference in its entirety.

FIELD OF THE INVENTION

The present invention generally relates to the field of power electronics, and more particularly to control circuits and associated switching converters and integrated circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

As an important type of circuit in power management chips, switching converters are widely used in various scenarios due to their wide range and high conversion efficiency. High-frequency switching power supplies are generally the direction of their development. In order to reduce the switching loss caused by high frequency operation, soft switching technology can be employed. In one approach, a quasi-resonant mode can be used to start the switching converter, an auxiliary winding in the switching converter can be used to detect the valley value of the drain-source voltage of the main power switch, and the main power switch of the switching converter can be controlled to be turned on when the drain-source voltage resonates to the valley. However, in this approach, the detection is carried out through the auxiliary winding, and additional circuits and pins may be needed, which increases the complexity and cost of the circuitry.

Figure 1:
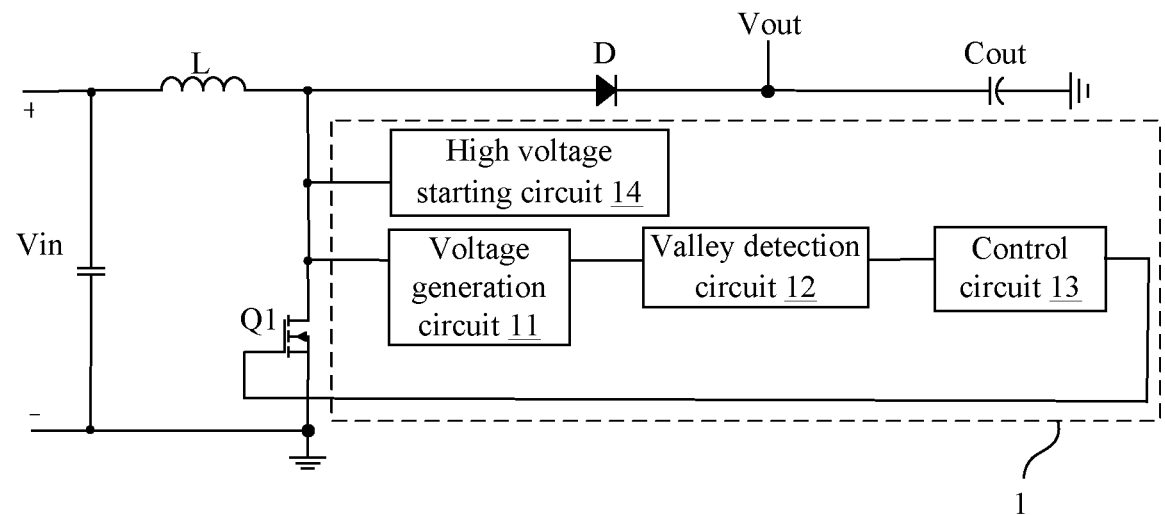
FIG. 1 is a schematic block diagram of an example control circuit of a switching converter, in accordance with embodiments of the present invention.

Referring now to FIG. 1, shown is a schematic block diagram of an example control circuit of a switching converter in accordance with embodiments of the present invention. In this particular example, control circuit 1 of the switching converter can include voltage generation circuit 11, valley detection circuit 12, and control circuit 13. Voltage generation circuit 11 can connect to the drain of the main power switch of the power stage circuit in the switching converter to receive a drain-source voltage of the main power switch, and to differentiate the drain-source voltage to generate a first voltage. For example, the voltage generation circuit can connect to a common connection terminal (e.g., a switching node) of the main power switch and an inductor through a multiplexed pin.

Valley detection circuit 12 can generate a valley detection signal by comparing the first voltage against the drain-source voltage, or by comparing the first voltage against a threshold voltage, in order to turn on the main power switch when the drain-source voltage resonates to the valley. For example, after the main power switch is turned off, and after the inductor current decreases to zero, the inductor may resonate with the parasitic capacitance in the main power switch, and as such the drain-source voltage resonates. Further, when the drain-source voltage of the main power switch resonates to a valley, the main power switch can be turned on, in order to realize the zero-voltage turn-on, thereby reducing turn-on loss. Control circuit 13 may generate a pulse-width modulation (PWM) control signal to control the turn-on and turn-off of the main power switch after receiving the valley detection signal.

Figure 2:
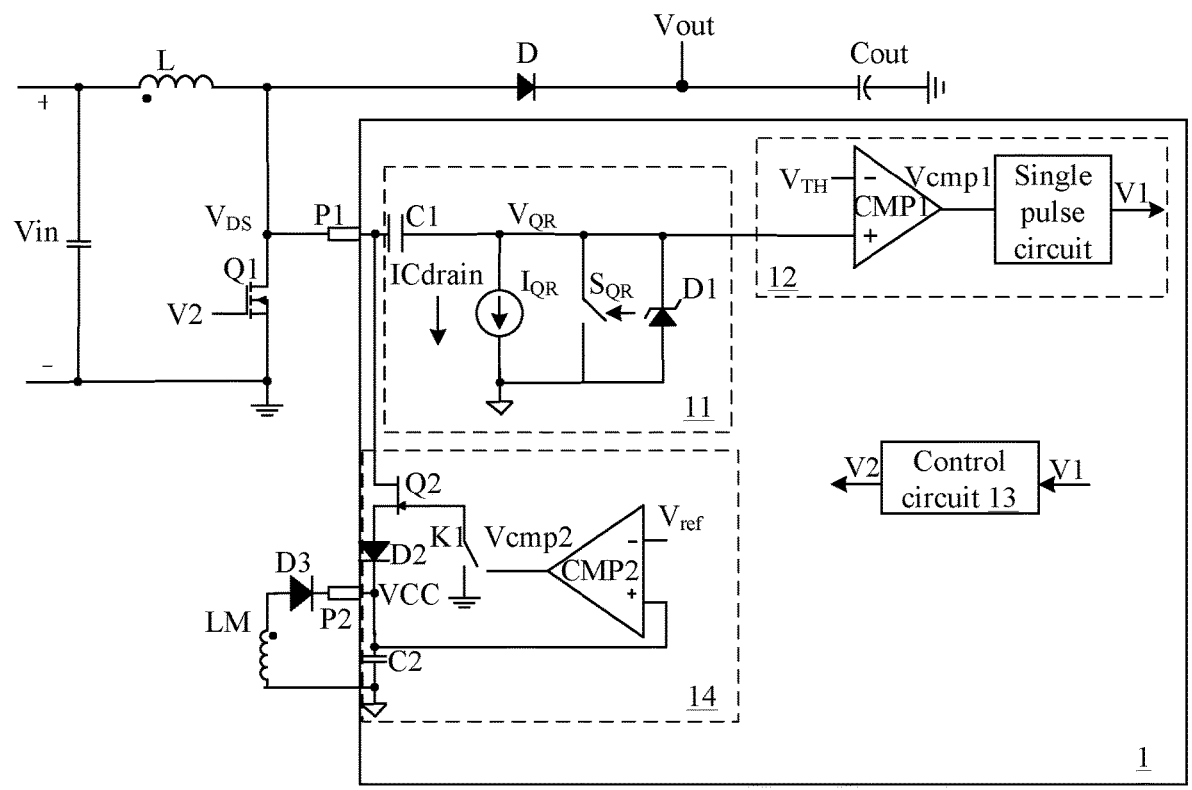
FIG. 2 is a schematic block diagram of a first example control circuit of the switching converter, in accordance with embodiments of the present invention.

Referring now to FIG. 2, shown is a schematic block diagram of a first example control circuit of the switching converter, in accordance with embodiments of the present invention. In particular embodiments, by directly detecting the drain-source voltage of the main power switch at the switch node of the switching converter, differentiating the drain-source voltage to generate a first voltage, and comparing the first voltage against the drain-source voltage or a threshold voltage, the valley value detection function can be realized. Here, the switch node can be used as a multiplexed pin to share with other functional pins, which can reduce the peripheral circuitry and optimize the number of chip pins. In this example, voltage generation circuit 11 can connect to the drain of main power switch Q1 to receive drain-source voltage $V_{DS}$ of the main power switch, and may differentiate drain-source voltage $V_{DS}$ to generate first voltage $V_{QR}$, such that a time point when the first voltage is greater than the threshold voltage may represent the valley value of the drain-source voltage.

For example, voltage generation circuit 11 can include independent capacitor C1. A first terminal of capacitor C1 can connect to the drain of main power switch Q1 through multiplexed pin P1, and a second terminal may generate first voltage $V_{QR}$. Further, voltage generation circuit 11 can also include current source $I_{QR}$. One terminal of current source $I_{QR}$ can connect to the second terminal of capacitor C1, and the other terminal of current source $I_{QR}$ can connect to ground. Further, the current flowing through capacitor C1 and current source $I_{QR}$ may jointly control the magnitude of first voltage $V_{QR}$. Voltage generation circuit 11 can also include switch $S_{QR}$, which can connect in parallel with current source $I_{QR}$, in order to control the working state of the current source.

It should be understood that the on-time period of switch $S_{QR}$ may not overlap with the active time period of current source $I_{QR}$. For example, before drain-source voltage $V_{DS}$ resonates to the valley, switch $S_{QR}$ can be turned off and current source $I_{QR}$ may be switched to an active state. When the main power switch is turned on, switch $S_{QR}$ can be turned on, and current source $S_{QR}$ may be shorted, such that current source $I_{QR}$ is switched to an inactive state. When Q1 is turned off, switch $S_{QR}$ can be turned on for a fixed period of time, in order to control the current source to be in an inactive state. Voltage generation circuit 11 can also include a clamping circuit, which can connect in parallel with current source $I_{QR}$. During the active period of current source $I_{QR}$, first voltage $V_{QR}$ may be clamped to a clamping voltage before drain-source voltage $V_D$s resonates to the valley. In particular embodiments, the clamping circuit may be formed by Zener diode D1. It should be understood that any suitable clamp circuits can also be utilized in certain embodiments.

Valley detection circuit 12 can generate a valley detection signal by comparing the first voltage against the threshold voltage, in order to turn on the main power switch when the drain-source voltage resonates to the valley. For example, valley detection circuit 12 can include comparator CMP1. A non-inverting input terminal of comparator CMP1 can connect to the second terminal of capacitor C1 to receive first voltage $V_{QR}$, and an inverting input terminal of comparator CMP1 may receive threshold voltage Vth to compare first voltage $V_{QR}$ against threshold voltage Vth and generate comparison signal Vcmp1 at an output terminal. During the active period of current source $I_{QR}$, when the current flowing through capacitor C1 is greater than the current of current source $I_{QR}$, first voltage $V_{QR}$ may gradually rise to threshold voltage Vth. Further, when first voltage $V_{QR}$ rises to threshold voltage Vth, comparison signal Vcmp1 generated by comparator CMP1 can be active.

Valley detection circuit 12 can also include a single pulse circuit connected to the output terminal of comparator CMP1 to receive comparison signal Vcmp1, in order to generate valley detection signal V1 with a predetermined width. Control circuit 13 can receive valley detection signal V1 to generate PWM control signal V2 to control the turn-on and turn-off of main power switch Q1. For example, when comparison signal Vcmp1 is switched to be active, valley detection signal V1 can be switched to be active, and thus control circuit 13 may generate an active PWM control signal to turn on main power switch Q1. Optionally, the control circuit can also include high-voltage startup circuit 14, which can connect to the common connection terminal (e.g., the drain of the main power switch) of main power switch Q1 and inductor L through multiplexed pin P1 to receive drain-source voltage $V_{DS}$, and may generate supply voltage VCC, in order to start the chip. For example, high-voltage startup circuit 14 can include starting power switch Q2, comparator CMP2, switch K1, and capacitor C2.

Optionally, starting power switch Q2 can be a junction field-effect transistor (FET). For example, a drain of starting power switch Q2 can connect to multiplexed pin P1 to receive drain-source voltage $V_{DS}$. Also, a non-inverting input terminal of comparator CMP2 may receive supply voltage VCC, and an inverting input terminal may receive reference voltage Vref. A terminal of switch K1 can connect to an output terminal of comparator CMP2, and the other terminal of switch K1 can connect to a control terminal of starting power switch Q2. A first terminal of capacitor C2 can be coupled to the drain of starting power transistor Q2, and a second terminal of capacitor C2 can connect to the control ground. Further, the voltage across capacitor C2 can be supply voltage VCC.

When supply voltage VCC is greater than reference voltage Vref, comparator CMP2 may generate an active comparison signal Vcmp2, and K1 can be turned on. At this time, starting power switch Q2 may be turned on, and drain-source voltage Vis can charge capacitor C2 through starting power switch Q2, such that the voltage across capacitor C2 (e.g., supply voltage VCC) may increase. When supply voltage VCC reaches the starting voltage value, the chip can begin to operate. Optionally, one terminal of power supply pin P2 can connect to supply voltage VCC, and the other terminal of power supply pin P2 can connect to the auxiliary power supply. The auxiliary power supply can include diode D3 and auxiliary winding LM (e.g., coupled to inductor L) connected in series. When the chip is started, the auxiliary power supply controlled by the chip may directly supply power to the chip.

Figure 3:
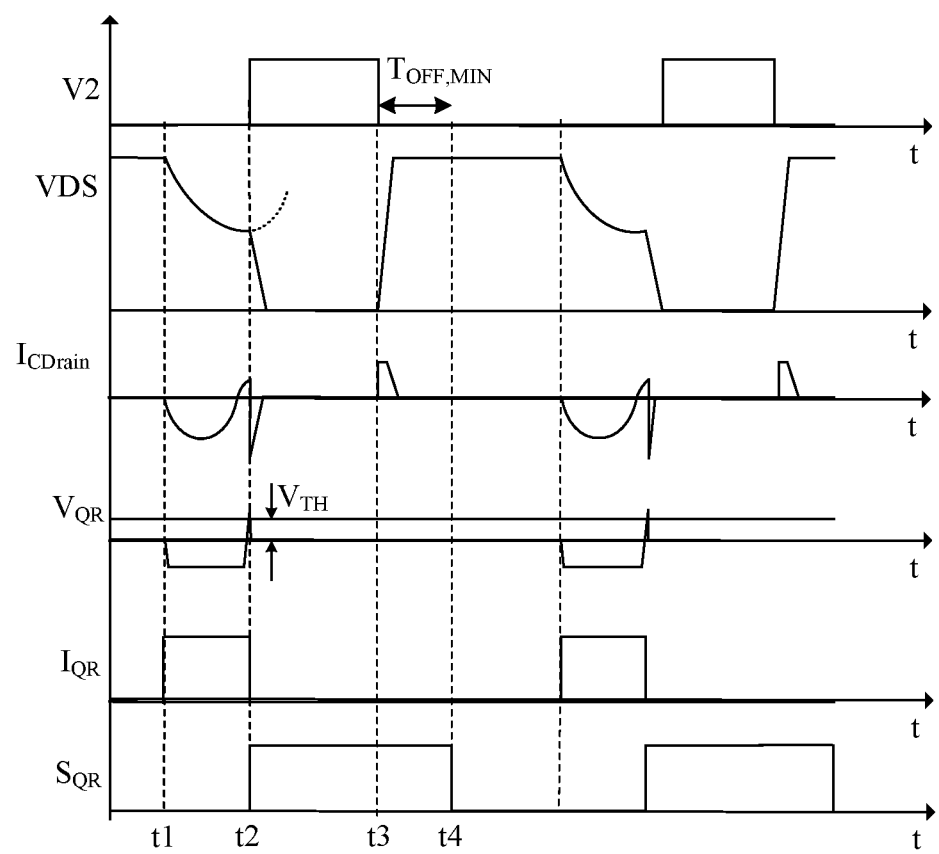
FIG. 3 is a waveform diagram of example operation of the first example control circuit of the switching converter, in accordance with embodiments of the present invention.

Referring now to FIG. 3, shown is a waveform diagram of example operation of the first example control circuit of the switching converter, in accordance with embodiments of the present invention. In particular embodiments, the power stage circuit of the switching converter is a boost converter, and any suitable converter topology (e.g., a buck converter, a flyback converter, etc.) can be supported in certain embodiments. In this example, current source $I_{QR}$ can be active at time t1. At time t1, main power switch Q1 has been turned off, and the circuit can begin to resonate. Also, current ICdrain flowing through capacitor C1 can be in the negative direction (e.g., in the direction opposite to the current of current source $I_{QR}$ in FIG. 2), and first voltage $V_{QR}$ may be clamped to a clamping voltage. When drain-source voltage $V_{DS}$ resonates to the valley, current ICdrain flowing through capacitor C1 can become positive (e.g., in the same direction of the current of current source $I_{QR}$ in FIG. 2), and may gradually increase. Also, first voltage $V_{QR}$ may remain clamped to the clamping voltage at this time.

When current ICdrain flowing through capacitor C1 increases in the positive direction to be equal to the current of current source $I_{QR}$, Zener diode D1 can be turned off, and first voltage $V_{QR}$ may no longer be clamped to a fixed value and can gradually increase. At time t2, capacitor current ICdrain can increase to a certain current value in the positive direction, and first voltage $V_{QR}$ can increase to be equal to threshold voltage Vth. Thus, valley detection circuit 12 may generate an active valley detection signal V1, and control circuit 13 may receive active valley detection signal V1 and generate an active PWM control signal V2 to turn on main power switch Q1. At this time, switch $S_{QR}$ can be turned on, and current source $I_{QR}$ may be switched to an inactive state. At time t3, main power switch Q1 can be turned off, and switch $S_{QR}$ may continue to be turned on for a fixed period of time $T_{OFF,MIN}$, and can be turned off at time t4.

Figure 4:
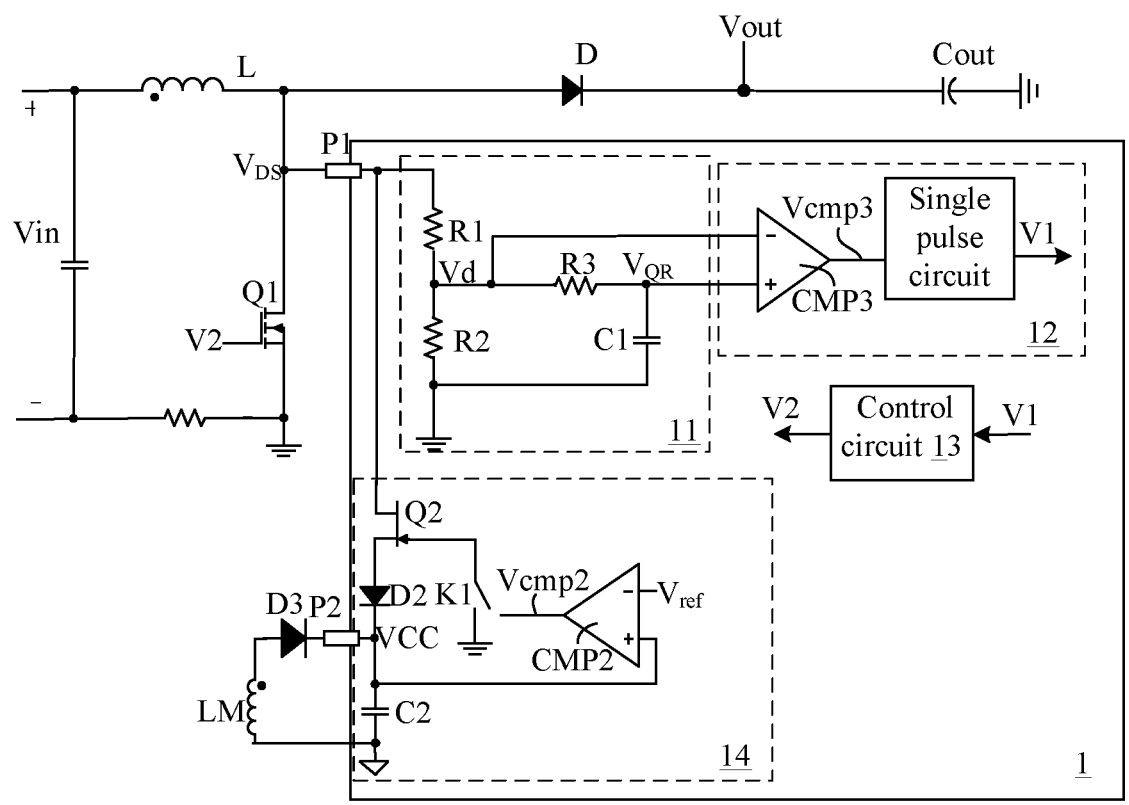
FIG. 4 is a schematic block diagram of a second example control circuit of the switching converter, in accordance with embodiments of the present invention.

Referring now to FIG. 4, shown is a schematic block diagram of a second example control circuit of the switching converter, in accordance with embodiments of the present invention. Voltage generation circuit 11 can connect to the drain of the main power switch to receive the drain-source voltage of the main power switch, and to differentiate the drain-source voltage to generate a first voltage. In this particular example, voltage generation circuit 11 can include a resistor divider including resistors R1 and R2 for dividing drain-source voltage $V_{DS}$. For example, a first terminal of the resistor divider can connect to the drain of main power switch Q1 through the multiplexed pin, and the voltage dividing output terminal (e.g., the common terminal of resistors R1 and R2) may generate sampling voltage Vd characterizing drain-source voltage $V_{DS}$, while a second terminal of the resistor divider is grounded. Further, voltage generation circuit 11 can also include an RC filter circuit for filtering sampling voltage Vd characterizing drain-source voltage $V_{DS}$ of main power switch Q1 to generate first voltage $V_{QR}$. Of course, the drain-source voltage of the main power switch can also be directly obtained and filtered to generate the first voltage in certain embodiments.

Valley detection circuit 12 can generate a valley detection signal by comparing the first voltage against the drain-source voltage, in order to turn on the main power switch when the drain-source voltage resonates to the valley. For example, valley detection circuit 12 can include comparator CMP3. Optionally, a non-inverting input terminal of comparator CMP3 can connect to the output terminal of the filter circuit to generate first voltage $V_{QR}$, and an inverting input terminal of comparator CMP3 can connect to the voltage dividing output terminal to receive sampling voltage Vd characterizing the drain-source voltage, and comparator CMP3 may generate comparison signal Vcmp3 at its output terminal by compare sampling voltage Vd and first voltage $V_{QR}$. Valley detection circuit 12 can also include a single pulse circuit connected to the output terminal of comparator CMP3 to receive comparison signal Vcmp3, and can generate valley detection signal V1 with a predetermined width. Control circuit 13 can receive valley detection signal V1 to generate PWM control signal V2 with a certain pulse width, in order to control the turn-on and turn-off of main power switch Q1.

In one embodiment, the filter circuit may have a first time constant, which can generate a phase-shifted sampling voltage by filtering sampling voltage Vd, and may take the phase-shifted sampling voltage as first voltage $V_{QR}$. When the non-inverting input terminal of comparator CMP3 connects to the output terminal of the filter circuit, and the inverting input terminal connects to the voltage dividing output terminal, the single pulse circuit may generate active valley detection signal V1 when the falling edge of comparison signal Vcmp3 is detected. Further, control circuit 13 can generate an active PWM control signal V2 to turn on main power switch Q1 after receiving active valley detection signal V1. Optionally, when the inverting input terminal of comparator CMP3 connects to the output terminal of the filter circuit, and the non-inverting input terminal connects to the voltage dividing output terminal, the difference from the above connection mode is that the single pulse circuit may generate active valley detection signal V1 when the rising edge of comparison signal Vcmp3 is detected. In particular embodiments, the control circuit can include the high-voltage starting circuit (e.g., as shown in FIG. 2), with the same or similar operating principle thereof.

Figure 5:
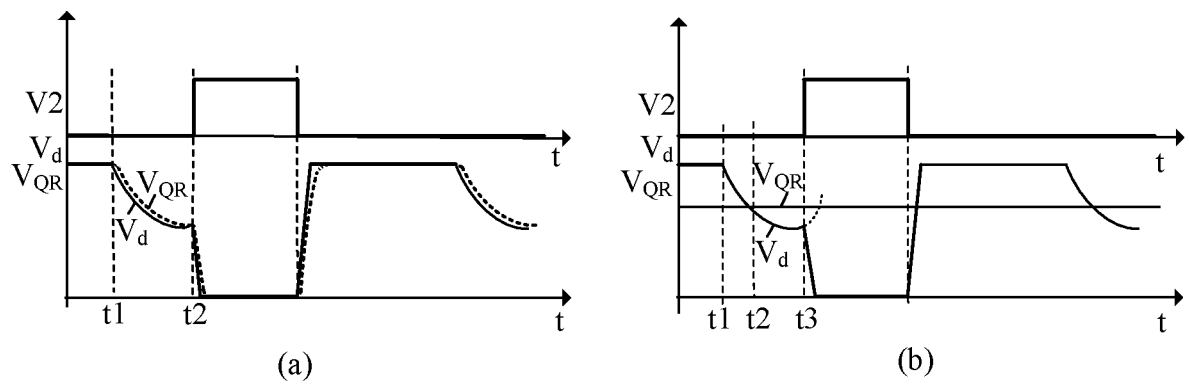
FIG. 5 is a waveform diagram of example operation of the second example control circuit of the switching converter, in accordance with embodiments of the present invention.

Referring to FIG. 5, shown is a waveform diagram of example operation of the second example control circuit of the switching converter, in accordance with embodiments of the present invention. In this example, the non-inverting input terminal of comparator CMP3 can connect to the output terminal of the filter circuit, and the inverting input terminal can connect to the voltage dividing output terminal as an example for description. As shown in (a) of FIG. 5, at time t1, main power switch Q1 can be turned off, and the circuit may begin to resonate at this time. During time period t1-t2, first voltage $V_{QR}$ can be greater than sampling voltage Vd, and comparison signal Vcmp3 can be active. At time t2, first voltage $V_{QR}$ may decrease to sampling voltage Vd. At this time, the circuit can detect the falling edge of comparison signal Vcmp3, the single pulse circuit may generate active valley detection signal V1, and control circuit 13 can generate an active PWM control signal V2 after receiving active valley detection signal V1, in order to control main power switch Q1 to turn on.

In another embodiment, the filter circuit may have a second time constant that is greater than the first time constant. Sampling voltage Vd can be filtered to obtain an average value of sampling voltage Vd, and the average value may be used as first voltage $V_{QR}$. When the non-inverting input terminal of comparator CMP3 is connected to the output terminal of the filter circuit, and the inverting input terminal is connected to the voltage dividing output terminal, comparison signal Vcmp3 can be delayed from the resonant time for a fixed time and then may output active valley detection signal V1. Further, when the rising edge of comparison signal Vcmp3 is detected, the single pulse circuit may output active valley detection signal V1 after the fixed time. For example, the fixed time is ¼ of the resonant period of the switching converter. Further, the control circuit may receive active valley detection signal V1, and can generate active PWM control signal V2 to turn on main power switch Q1. Optionally, when the inverting input terminal of comparator CMP3 is connected to the output terminal of the filter circuit, and the non-inverting input terminal is connected to the voltage dividing output terminal, the difference from the above connection mode is that when the falling edge of comparison signal Vcmp3 is detected, the single pulse circuit may generate active valley detection signal V1 after the fixed time.

For example, the non-inverting input terminal of comparator CMP3 can connect to the output terminal of the filter circuit, and the inverting input terminal of comparator CMP3 can connect to the voltage dividing output terminal. As shown in (b) of FIG. 5, at time t1, main power switch Q1 can be turned off, and the circuit may begin to resonate at this time. In time period t1-t2, first voltage $V_{QR}$ may be less than sampling voltage Vd, and comparison signal Vcmp3 can be at a low level. At time t2, the first voltage may decrease to sampling voltage Vd, and the circuit can detect the rising edge of comparison signal Vcmp3. At time t3, e.g., after detecting the ¼ resonance period has passed from the rising edge of the comparison signal, the single pulse circuit may generate an active valley detection signal V1. After receiving active valley detection signal V1, control circuit 13 can generate an active PWM control signal to turn on main power switch Q1.

In particular embodiments, the control circuit can include a voltage generation circuit and a valley detection circuit, where the voltage generation circuit can connect to the main power switch in the switching converter through a multiplexed pin, may receive the drain-source voltage of the main power switch and differentiates it to generate a first voltage, and the valley detection circuit may generate a valley detection signal by comparing the first voltage against the drain-source voltage, or by comparing the first voltage against a threshold voltage, in order to turn on the main power switch when the drain-source voltage resonates to the valley. In particular embodiments, the valley point of the resonance voltage can be directly detected at the switch node of the switching converter, and the switch node may be shared with other functional pins, which can reduce the peripheral circuitry and optimize the number of pins.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching converter having a main power switch, the control circuit comprising:
   a) a voltage generation circuit configured to be connected with a common connection terminal of the main power switch and an inductor to receive a drain-source voltage of the main power switch, and to generate a first voltage according to the drain-source voltage;
   b) a valley detection circuit configured to generate a valley detection signal according to the first voltage when the drain-source voltage resonates to a valley; and
   c) wherein the control circuit is configured to turn on the main power switch according to the valley detection signal.

2. The control circuit of claim 1, wherein the first voltage is generated by differentiating the drain-source voltage.

3. The control circuit of claim 1, wherein the valley detection circuit is configured to generate the valley detection signal by performing zero-crossing detection of the first voltage.

4. The control circuit of claim 3, wherein the valley detection circuit is configured to generate the valley detection signal by comparing the first voltage against a threshold voltage.

5. The control circuit of claim 4, wherein the valley detection signal switches to an active state when the first voltage increases to the threshold voltage.

6. The control circuit of claim 1, wherein the voltage generation circuit comprises an independent capacitor, wherein a first terminal of the capacitor is connected to a drain of the main power switch, and the voltage signal at a second terminal of the capacitor is configured as the first voltage.

7. The control circuit of claim 6, wherein the voltage generation circuit further comprises a current source connected between the second terminal of the capacitor and a control ground to adjust a current flowing through the capacitor, thereby controlling the first voltage.

8. The control circuit of claim 7, wherein during an active period of the current source, the first voltage gradually increases to the threshold voltage when the current flowing through the capacitor is greater than the current of the current source.

9. The control circuit of claim 8, wherein the voltage generation circuit further comprises a switch, which is connected in parallel with the current source to control the current source to switch to an active state before the drain-source voltage resonates to the valley.

10. The control circuit of claim 7, wherein the voltage generation circuit further comprises a clamp circuit connected in parallel with the current source, and being configured to clamp the first voltage to a clamping voltage before the drain-source voltage resonates to the valley during the active period of the current source.

11. The control circuit of claim 1, wherein the first voltage is generated by filtering the drain-source voltage, and the valley detection circuit is configured to generate the valley detection signal by comparing the first voltage and the drain-source voltage.

12. The control circuit of claim 11, wherein the voltage generation circuit can include a filter circuit which filters a sampling voltage characterizing the drain-source voltage of the main power switch to generate the first voltage.

13. The control circuit of claim 12, wherein the filter circuit has a first time constant, and generates a phase shifted sampling voltage by filtering the sampling voltage, and whereby the phase shifted sampling voltage is configured as the first voltage.

14. The control circuit of claim 13, wherein the valley detection circuit is configured to generate a comparison signal by comparing the first voltage and the sampling voltage, and to generate the valley detection signal according to the transition edge of the comparison signal.

15. The control circuit of claim 12, wherein the filter circuit has a second time constant, and generates an average of the sampling voltage by filtering the sampling voltage, whereby the average is configured as the first voltage.

16. The control circuit of claim 15, wherein the valley detection circuit is configured to generate a comparison signal by comparing the first voltage and the sampling voltage, and to generate the valley value detection signal at a time when the transition edge of the comparison signal is delayed by a fixed time.

17. The control circuit of claim 16, wherein the fixed time is ¼ of the resonant cycle.

18. The control circuit of claim 1, further comprising a high voltage starting circuit configured to receive the drain-source voltage, and to generate a supply voltage for starting the control circuit.

19. An integrated circuit, comprising a control circuit configured to generate a control signal to control a switching state of a main power switch of a power stage circuit, the control circuit comprising:
   a) a voltage generation circuit configured to receive a drain-source voltage of the main power switch, and to generate a first voltage according to the drain-source voltage;
   b) a valley detection circuit configured to generate a valley detection signal when the drain-source voltage resonates to a valley; and
   c) wherein the control circuit is configured to turn on the main power switch according to the valley detection signal.

20. The integrated circuit of claim 19, wherein the first voltage is generated by differentiating or filtering the drain-source voltage.

* * * * *